US012638874B2

(12) United States Patent
Li et al.

(10) Patent No.: US 12,638,874 B2
(45) Date of Patent: May 26, 2026

(54) PROCESSOR AND COMPUTING SYSTEM

(71) Applicant: SHENZHEN MICROBT ELECTRONICS TECHNOLOGY CO., LTD., Guangdong (CN)

(72) Inventors: Nan Li, Guangdong (CN); Chao Xu, Guangdong (CN); Zhijun Fan, Guangdong (CN); Zuoxing Yang, Guangdong (CN); Haifeng Guo, Guangdong (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 19 days.

(21) Appl. No.: 18/269,905

(22) PCT Filed: Jan. 7, 2022

(86) PCT No.: PCT/CN2022/070714
§ 371 (c)(1),
(2) Date: Jun. 27, 2023

(87) PCT Pub. No.: WO2022/152051
PCT Pub. Date: Jul. 21, 2022

(65) Prior Publication Data
US 2024/0077906 A1 Mar. 7, 2024

(30) Foreign Application Priority Data
Jan. 14, 2021 (CN) .......................... 202110049238.3

(51) Int. Cl.
*G06F 1/08* (2006.01)
*G06F 1/06* (2006.01)
(Continued)

(52) U.S. Cl.
CPC .................. *G06F 1/08* (2013.01); *G06F 1/06* (2013.01); *G06F 1/10* (2013.01); *G06F 9/3869* (2013.01)

(58) Field of Classification Search
CPC ..... G06F 1/06; G06F 1/08; G06F 1/10; G06F 9/3869; G06F 2207/3884; G06F 9/3001; H03K 3/037; H03K 19/003
See application file for complete search history.

(56) References Cited

U.S. PATENT DOCUMENTS 5,548,797 A * 8/1996 Arimilli ................ G06F 9/3869
                                                              710/60
6,513,125 B1    1/2003 Garde
(Continued)

FOREIGN PATENT DOCUMENTS

CN        1387340 A    12/2002
CN        1760803 A    4/2006
(Continued)

OTHER PUBLICATIONS

Stones, Jon. "Pipelining: An Overview (Part I)". Ars Technica. Online Sep. 19, 2004. Retrieved from Internet May 15, 2025. <https://arstechnica.com/features/2004/09/pipelining-1> (Year: 2004).*
(Continued)

*Primary Examiner* — Thomas J. Cleary
(74) *Attorney, Agent, or Firm* — Merchant & Gould P.C.

(57) ABSTRACT

The present disclosure relates to a processor and a computing system. A processor is provided, including: a pipeline stage, including sequential device(s); and a first clock driving circuit, configured to provide a clock signal to the pipeline stage, wherein the first clock driving circuit includes: a plurality of first clock paths, configured to provide corresponding clock signals respectively; a first selector, configured to select a clock signal from the clock
(Continued)

signals provided by the plurality of first clock paths for the pipeline stage.

12 Claims, 4 Drawing Sheets

(51) Int. Cl.
*G06F 1/10* (2006.01)
*G06F 9/38* (2018.01)

(56) References Cited

U.S. PATENT DOCUMENTS

| | | | | |
|---|---|---|---|---|
| 7,017,064 | B2 * | 3/2006 | Thomas | G06F 1/10 713/400 |
| 7,545,188 | B1 * | 6/2009 | Xu | H03D 7/1458 327/148 |
| 7,545,196 | B1 * | 6/2009 | Hutton | G06F 1/10 327/291 |
| 7,627,003 | B1 | 12/2009 | Fouts et al. | |
| 7,958,483 | B1 * | 6/2011 | Alben | G06F 1/3203 716/132 |
| 8,020,027 | B1 * | 9/2011 | Hutton | G06F 9/3869 327/161 |
| 2002/0066910 | A1 * | 6/2002 | Tamemoto | G06F 1/3275 711/E12.017 |
| 2002/0188882 | A1 | 12/2002 | Thomas et al. | |
| 2003/0122582 | A1 | 7/2003 | Samaan | |
| 2006/0080560 | A1 | 4/2006 | Miller | |
| 2009/0044038 | A1 | 2/2009 | Lee | |
| 2009/0134707 | A1 * | 5/2009 | Liang | H03K 5/135 307/80 |
| 2009/0138674 | A1 * | 5/2009 | Chang | G06F 9/30181 712/23 |
| 2009/0138676 | A1 * | 5/2009 | Pratt | G06F 1/06 712/30 |
| 2010/0085823 | A1 | 4/2010 | Carpenter et al. | |
| 2013/0305078 | A1 | 11/2013 | Lee et al. | |
| 2014/0223220 | A1 | 8/2014 | Guntur et al. | |
| 2015/0348605 | A1 * | 12/2015 | Jang | G11C 29/022 365/230.02 |
| 2017/0351318 | A1 * | 12/2017 | Gu | G06F 9/30145 |
| 2018/0145849 | A1 * | 5/2018 | Tam | G06F 1/10 |
| 2021/0247797 | A1 * | 8/2021 | Gu | G06F 1/10 |
| 2022/0271753 | A1 * | 8/2022 | Xue | G06F 15/7817 |
| 2022/0352898 | A1 * | 11/2022 | Liu | H03L 7/089 |
| 2023/0014113 | A1 * | 1/2023 | Vijayaraghavan | H04L 9/50 |
| 2023/0123281 | A1 * | 4/2023 | Liu | G06F 1/08 713/501 |
| 2023/0236622 | A1 * | 7/2023 | Li | G06F 1/10 713/500 |
| 2024/0036113 | A1 * | 2/2024 | Chen | G01R 31/3183 |

FOREIGN PATENT DOCUMENTS

| | | | |
|---|---|---|---|
| CN | 103218029 | A | 7/2013 |
| CN | 103389952 | A | 11/2013 |
| CN | 108363891 | A | 8/2018 |
| CN | 109905116 | A | 6/2019 |
| CN | 111562808 | A | 8/2020 |
| CN | 212160484 | U | 12/2020 |
| CN | 213879787 | U | 8/2021 |
| JP | 2003316566 | A | 11/2003 |
| WO | 2005/103885 | A2 | 11/2005 |

OTHER PUBLICATIONS

"Fetching Data Using a Multiplexer". 101 Computing. Online Sep. 24, 2018. Retrieved from Internet Sep. 8, 2025. <https://www.101computing.net/fetching-data-using-a-multiplexer>. (Year: 2018).*

International Search Report for PCT/CN2022/070714 mailed on Mar. 7, 2022 (6 pages including English Translation).

Written Opinion for PCT/CN2022/070714 mailed on Mar. 7, 2022 (6 pages including English Translation).

Taiwan Office Action issued on Jul. 25, 2022 for Patent Application No. 111100706 (11 pages including English Translation).

Taiwan Search Report for Patent Application No. 111100706 (1 page).

Taiwan Office Action issued on Dec. 19, 2014 for Patent Application No. 202110049238.3 (18 pages including English Translation).

Grant of Patent dated Jun. 20, 2025 for corresponding CN Application No. 202110049238.3 (8 pages including English Translation).

Cao Junmin et al., "A Low Power 12-Bit 20Msamples/s Pipelined ADS", 2009 International Conference on Signal Processing Systems, DOI 10.1109/ICSPS.2009.16, pp. 77-80.

* cited by examiner

~CK

D→ | Three-state gate | → | INV/BUF | → Q

CK

PROCESSOR AND COMPUTING SYSTEM

CROSS-REFERENCE TO RELATED APPLICATIONS

This application is a National Stage Application of International Application No. PCT/CN2022/070714, filed 7 Jan. 2022, which claims benefit of Serial No. 202110049238.3, filed 14 Jan. 2021 in China, and which applications are incorporated herein by reference. To the extent appropriate, a claim of priority is made to each of the above disclosed applications.

TECHNICAL FIELD

The present disclosure relates to a processor and a computing system.

BACKGROUND

In recent years, digital currency has attracted increasingly more attention. In related fields, an improved processor and computing system are needed.

A mining machine processor is generally designed to adopt a pipeline structure. Operation logic is divided into several pipeline stages according to an algorithm, and all pipeline stages have a similar functional design and operation structure. Each of the pipeline stages needs to be inputted with a working clock, that is, a pulse clock.

With the use of more advanced manufacturing process in the production of the mining machine processor, the complexity and dispersion of the process are increasingly higher, which leads to a large deviation between the actual working condition and the simulation environment in the design stage of the processor. Even if a clock driving circuit meets the requirement for the clock under the simulation condition in the design stage, the pipeline clock of some of actual processors often fails to meet the design requirements due to the difference between the actual processor and the simulation environment.

Therefore, an improved processor and computing system are needed.

SUMMARY

According to an aspect of the present disclosure, there is provided a processor, comprising: a pipeline stage, comprising sequential device(s); and a clock driving module, configured to provide a clock signal to the pipeline stage, wherein the clock driving module comprises a first clock driving circuit, and the first clock driving circuit comprises: a plurality of first clock paths, configured to provide corresponding clock signals respectively; and a first selector, configured to select a clock signal from the clock signals provided by the plurality of first clock paths for the pipeline stage.

In some embodiments, the processor comprises one or more cores, wherein the pipeline stage and the clock driving module are arranged in the core(s).

In some embodiments, the clock driving module further comprises: a second clock driving circuit, configured to adjust a pulse width of the clock signal selected by the selector and provide the clock signal with the adjusted pulse width for the pipeline stage.

In some embodiments, the second clock driving circuit comprises: a plurality of second clock paths, configured to receive the selected clock signal respectively and provide clock signals with different phases based on the selected clock signal on respective second clock paths; and a logic unit, configured to generate a clock signal with an adjusted pulse width for the pipeline stage based on at least part of the clock signals with different phases.

In some embodiments, the plurality of second clock paths comprise at least a first path and a second path; the first path provides the selected clock signal to the logic unit; and the second path provides an inverted version or an inverted and delayed version of the selected clock signal to the logic unit.

In some embodiments, the logic unit is an AND gate or an OR gate.

In some embodiments, the second path comprises: an inverter, configured to receive the selected clock signal and generate a clock signal which is inverted to the selected clock signal; and one or more sub-paths, configured to provide corresponding versions of the inverted clock signal respectively to a second selector; and the second selector, configured to select a version from the different versions of the inverted clock signal and provide the selected version to the logic unit.

In some embodiments, the one or more sub-paths respectively provide versions with different delays of the inverted clock signal to the second selector.

In some embodiments, the plurality of first clock paths receive a common clock input and respectively provide clock signals with different phases based on the clock input.

In some embodiments, the processor is a processor for digital currency.

In some embodiments, the sequential device(s) comprise(s) one or more latches, and the selected clock signal is used for the one or more latches.

According to another aspect of the present disclosure, there is further provided a computing system, comprising the processor according to any embodiment of the present disclosure.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings that constitute a part of the specification illustrate embodiments of the present disclosure and are used to explain the principle of the present disclosure together with the specification.

With reference to the accompanying drawings, according to the following detailed descriptions, the present disclosure may be understood more clearly, wherein.

It is to be noted that in the implementations illustrated in the following, sometimes the same reference signs are used in different accompanying drawings to represent the same parts or parts with the same function, and repeated descriptions thereof are omitted. In this specification, similar numbers and letters are used to represent similar items. Therefore, once an item is defined in an accompanying drawing, the item in subsequent accompanying drawings will not be further discussed.

For ease of understanding, locations, sizes, scopes and the like of structures shown in the accompanying drawings sometimes do not represent practical locations, sizes, scopes and the like. Therefore, the disclosed invention is not limited to the locations, the sizes, the scopes and the like disclosed in the accompanying drawings.

DETAILED DESCRIPTION

Various exemplary embodiments of the present disclosure are described in detail with reference to the accompanying drawings now. It should be noted that unless illustrated in detail otherwise, the relative deployment of the components and steps, the numerical expression and the values stated in these embodiments do not limit the scope of the present disclosure. In addition, the technology, method and device known to a person of ordinary skill in the related art may not be discussed in detail, but in proper circumstances, the technology, method and device shall be regarded as a part of the authorized specification.

In fact, the following description of at least one exemplary embodiment is merely illustrative, and is not as any limitation to the present disclosure and to application or use thereof. It should be further understood that any implementation exemplarily described herein is not necessarily to be explained as preferred or advantageous over other implementations. The present disclosure is not limited by any expressed or implied principle given in the foregoing technical field, background, summary, or detailed implementation.

Furthermore, some terms may also be used in the following description for a reference purpose only, and thus are not intended for a limitation. For example, the terms "first" "second" and other such numerical terms relating to the structure or element do not imply the sequence or the order unless the context clearly indicates otherwise.

It should be further understood that the word "comprise/include", when used herein, specifies the presence of stated features, integers, steps, operations, units, and/or components, but do not preclude the presence or addition of one or more other features, integers, steps, operations, units, and/or components, and/or combinations thereof.

Figure 1:
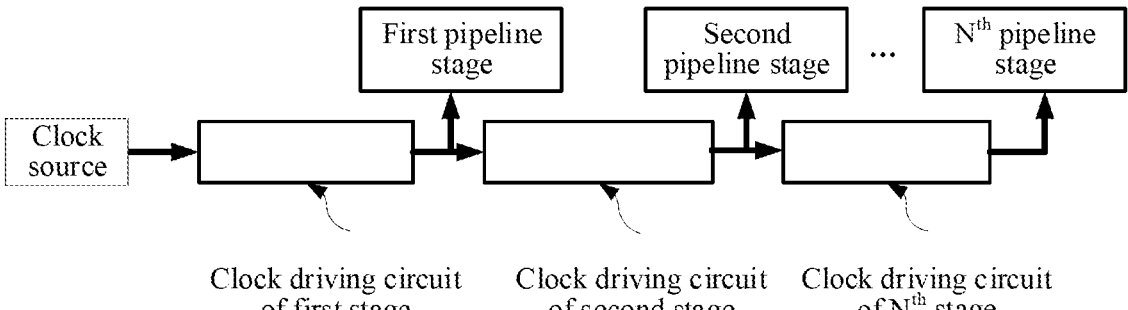
FIG. 1 shows a schematic diagram of an exemplary pipeline processor.

FIG. 1 shows a schematic diagram of an exemplary pipeline processor. In a conventional pipeline processor, working clocks of all pipeline stages usually come from the same clock source, and are transmitted among all the pipeline stages through stages of clock driving circuits for all the pipeline stages, as shown in FIG. 1.

In addition, the pipeline stage of a processor often has one or more sequential devices, for example, a flip-flop. However, selecting a latch as the sequential device in the pipeline can effectively reduce power consumption and area overheads, and enhance the competitiveness of mining machine products.

For the pipeline design using the latch, the clocks between adjacent pipelines need to meet certain requirements for phase to meet the specific timing requirement of the latch, for example, requirements for hold timing of the latch and requirements for a minimum pulse width of the latch, which imposes higher requirements for the design and manufacturing process of a clock-related circuit. However, with the use of advanced process, the complexity and dispersion of the process are increasingly higher, which leads to a large deviation between the actual working condition and the simulation environment in the design stage of the processor. In this way, even if a clock driving circuit meets the requirement for the clock under the simulation condition in the design stage, the pipeline clock of some of the actual processors often fails to meet the design requirements due to the difference between the actual processor and the simulation environment. This also causes the yield of the processor to be limited.

The inventor of this application has realized one or more of the above problems, and provided an improved processor and computing system disclosed herein.

Figure 2:
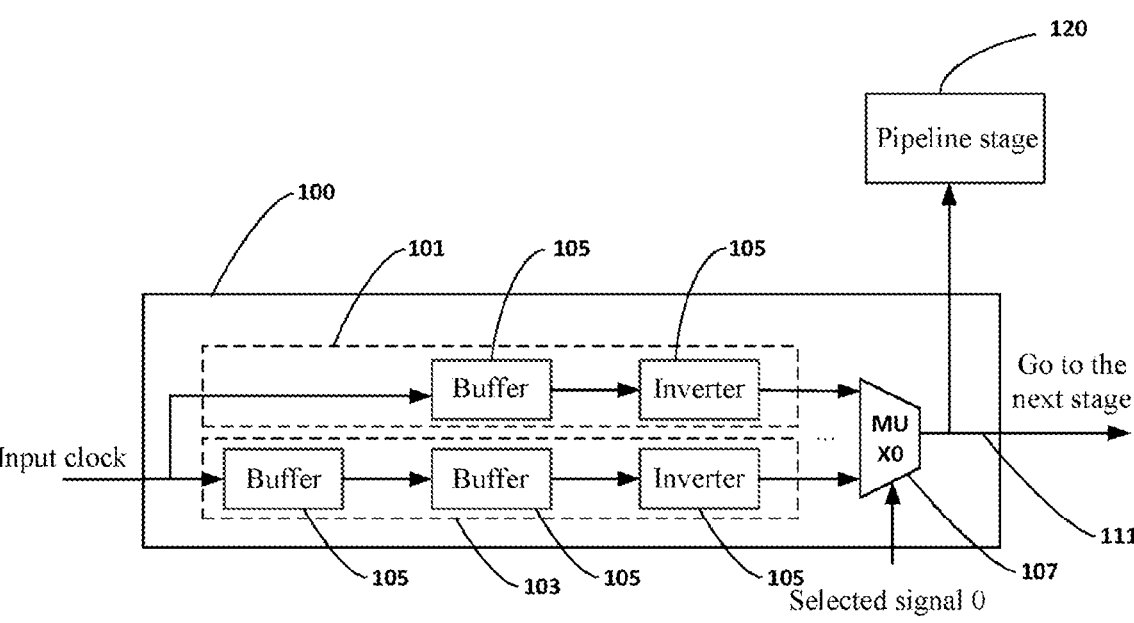
FIG. 2 shows a schematic diagram of a processor according to an embodiment of the present disclosure.

FIG. 2 shows a schematic diagram of a processor according to an embodiment of the present disclosure.

According to the embodiment of the present disclosure, a processor is provided. As shown in FIG. 2, the processor may include a clock driving module (not shown) and a pipeline stage 120. The clock driving module may include a clock driving circuit (a first clock driving circuit) 100. The pipeline stage 120 may include sequential device(s), for example, a flip-flop or a latch. Preferably, the sequential device is a latch. The clock driving circuit 100 may be configured to provide a clock signal to the pipeline stage. In the embodiment shown in FIG. 2, the clock driving module may also be indicated by a reference numeral 100. However, in other embodiments, as will be shown in later figures, the clock driving module may further include other components besides the first clock driving circuit 100.

Figures 5, 6:
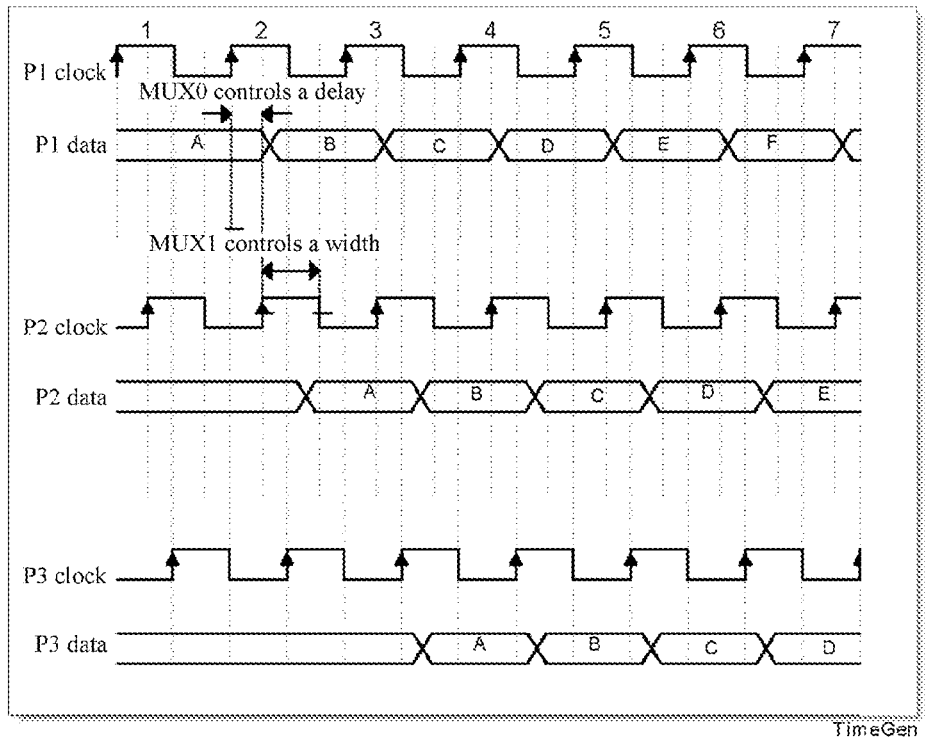
FIG. 5 shows an exemplary timing diagram of a pipeline according to an embodiment of the present disclosure.
FIG. 6 shows a schematic diagram of a latch in a processor according to an embodiment of the present disclosure.

The latch is a kind of memory cell circuit sensitive to pulse level, which is a sequential device. FIG. 6 shows a schematic diagram of a latch in a processor according to an embodiment of the present disclosure. The latch may include a three-state gate and an inverter/buffer. The three-state gate receives an input D, and receives a clock signal and an inverted clock signal. An output of the three-state gate is connected to the inverter/buffer (INV/BUF). An output of the inverter/buffer (INV/BUF) serves as an output Q of the latch.

An important indicator of the latch is the minimum pulse width of a clock pulse, that is, a length of time during which a high-level clock or a low-level clock needs to be maintained when the latch is in an on state. In other words, the latch has certain requirements for a high-level or low-level duty cycle. Another important indicator of the latch is the hold timing of the latch, that is, the minimum time during which a signal at an input terminal of the latch needs to remain unchanged after the latching by the clock.

Returning to FIG. 2, as shown in FIG. 2, the clock driving circuit 100 may include a plurality of clock paths (first clock paths) 101 and 103, and the like, which respectively provide corresponding clock signals to a selector MUX0. Herein, clock paths 101 and 103 are only exemplarily shown in FIG. 2. However, in other embodiments, the clock driving circuit may include more clock paths (first clock paths).

In some embodiments, the clock paths may receive the same input clock, and perform various delays and/or phase inversion processing on the input clock to obtain different versions of clock signals. For example, in some embodiments, the clock paths provide different delays with respect to each other and/or provide inversion to the input clock. In some other embodiments, some clock paths may also provide the same delay or inversion. At least part of the clock paths may have a clock adjustment unit 105, for example, a buffer or an inverter, to adjust properties of the clock signals, such as the phase. As shown in the figure, the clock path 101 has one buffer (assuming that a delay is τ) and an inverter (performing phase inversion), and the clock path 103 has two buffers (assuming that the delays are τ respectively) and an inverter (performing inversion), so as to delay the input clock differently, thereby respectively providing a version of clock signal which is inverted and delayed by τ and a version of clock signal version which is inverted and delayed by 2τ. In some cases, a clock path without the adjustment unit 105 may also be provided. It should be further understood that a phase adjustment unit may be arranged as required.

The clock driving circuit 100 may include the selector (a first selector) MUX0 107 configured to select a clock signal from the clock signals provided by the plurality of first clock paths for a corresponding pipeline stage 120. For example, the selector 107 may select a clock signal from a plurality of first clock paths based on a selected signal (for example, a selected signal 0) to provide the selected clock signal as a clock output 111 to the pipeline stage 120 or a next pipeline stage.

Under an actual operating condition of the processor, it may be determined by the selected signal (for example, the selected signal 0) which clock signal is used as an output clock, so as to meet the timing requirements of the pipeline stage, for example, requirements for the hold timing and the minimum clock pulse width of the latch.

As shown in FIG. 2, clocks with different delays on clock paths 101 and 103 reach two input terminals of MUX0. The selected signal 0 may be set according to the requirement to select one of the two clock paths as the clock output to be transferred to the clock driving circuit of the current pipeline stage and/or the next pipeline stage. Clock phases in two adjacent pipeline stages may be adjusted separately (each has two (or more) different delays), thereby better meeting the timing requirement of the latch in each pipeline stage.

In some other embodiments, the processor may have one or more cores. The pipeline stage, the clock driving circuit, and the like described above may be arranged in the core.

Figure 3:
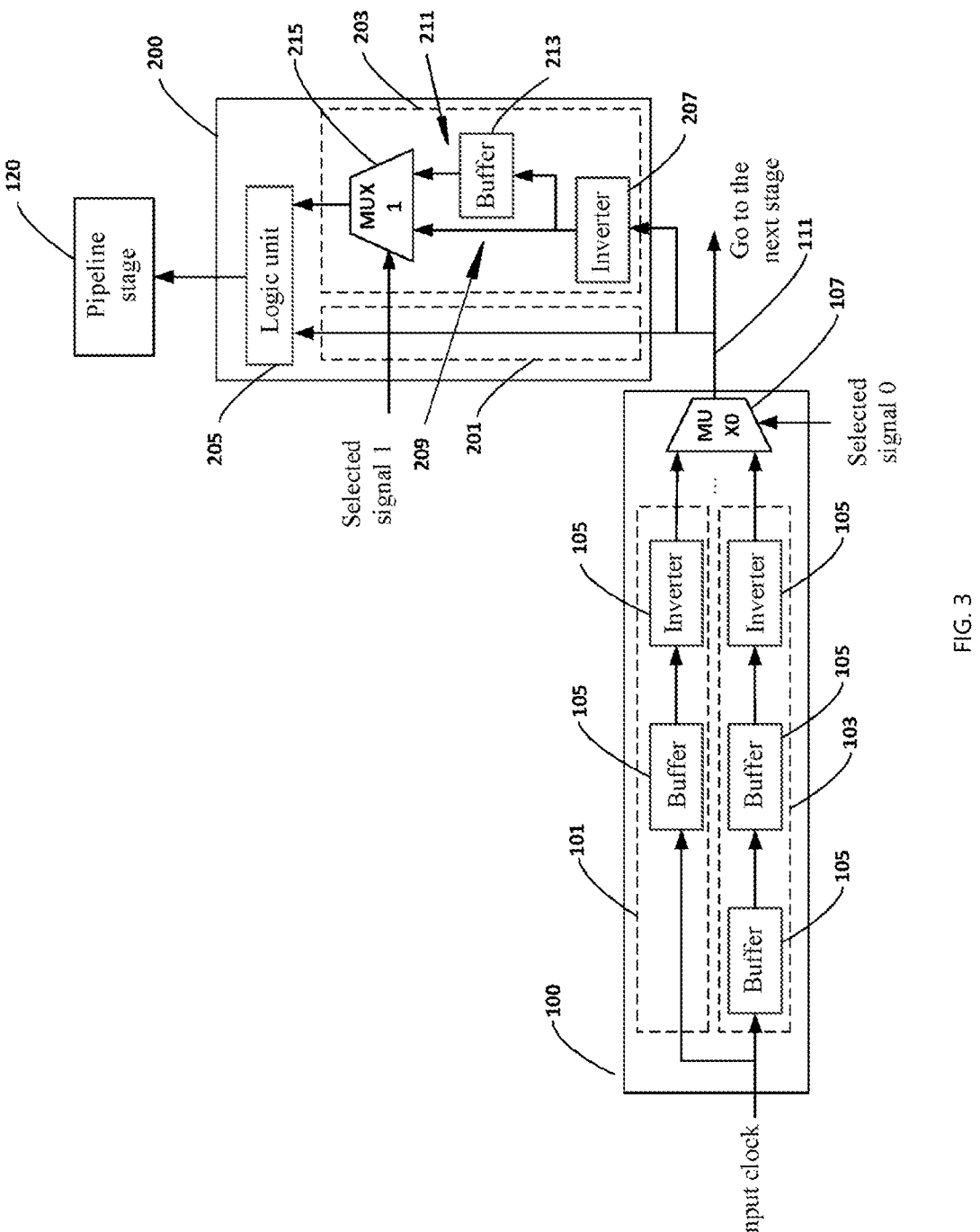
FIG. 3 shows a schematic diagram of a processor according to another embodiment of the present disclosure.

FIG. 3 shows a schematic diagram of a processor according to another embodiment of the present disclosure. Compared with the embodiment of the processor shown in FIG. 2, the clock driving module in the processor in the embodiment shown in FIG. 3 further includes another clock driving circuit (a second clock driving circuit) 200, which is configured to receive a clock output provided by the clock driving circuit 100 and provide a further adjusted clock output to a pipeline stage 120.

Herein, the same parts as those in the embodiment of FIG. 2 are given the same numbers, and the content described above with respect to FIG. 2 may be equally or adaptively applied thereto. Therefore, repeated description thereof is omitted.

In some embodiments, the second clock driving circuit 200 is configured to adjust a pulse width of the clock signal selected by the selector MUX0 107 and provide the clock signal with the adjusted pulse width for the pipeline stage.

It should be noted herein that "the clock signal for a to-be-tested sequential device" is intended to mean that the clock signal may be directly used for (for example, directly provided to) the to-be-tested sequential device, or the clock signal may be indirectly used for (for example, indirectly rather than directly provided to) the to-be-tested sequential device. In other words, an intermediate module or device may exist between the clock signal and the to-be-tested sequential device, and the intermediate module or device may provide a clock to the to-be-tested sequential device based on the clock signal.

In a specific implementation, as shown in FIG. 3, the second clock driving circuit 200 may include a plurality of second clock paths 201, 203, and the like, which are configured to receive the selected clock signal respectively and provide clock signals with different phases to a logic unit 205 based on the selected clock signal on respective second clock paths. The logic unit 205 is configured to generate a clock signal with an adjusted pulse width for a pipeline stage 120 based on at least part of the clock signals with different phases. In some specific embodiments, the logic unit 205 may be an AND gate or an OR gate. The present disclosure is not limited thereto.

The plurality of second clock paths include at least a first path and a second path. In the example shown in FIG. 3, the first path 201 may be configured to directly provide a clock output (that is, the selected clock signal as mentioned above) received from the MUX0 to the logic unit 205. The second path 203 may be configured to provide a further adjusted version (for example, an inverted version or an inverted and delayed version) to the logic unit 205 based on the clock output received from the MUX0.

As shown in the figure, the second path 203 may include an inverter 207. The inverter 207 is configured to receive a clock output (that is, the selected clock signal) 111 of the first clock driving circuit 100, and generate a clock signal which is inverted to the clock output (that is, the selected clock signal) 111. The second path 203 may further include one or more sub-paths, for example, sub-paths 209 and 211 shown in the figure. The sub-paths 209 and 211 are configured to provide corresponding versions of the inverted clock signal to a second selector 215 respectively. For example, in the example shown in FIG. 3, the sub-path 211 delays the inverted clock signal by a buffer to provide a delayed version of the inverted clock signal, and the sub-path 209 provides the inverted clock signal which is not subjected to processing. In this way, an output signal of the inverter reaches two input terminals of the selector MUX1 through two clock transfer paths with different delays. It should be further understood herein that it may be determined as required whether the inverter 207 is arranged, and positions or a number of the arranged inverters may also be changed as required.

A second selector MUX1 215 is configured to select a version from the different versions of the inverted clock signal and provide the selected version to the logic unit. The MUX1 may select an appropriate clock path delay to meet the requirement for a pulse width of the sequential device (for example, a latch) in the current pipeline stage.

In the example shown in FIG. 3, the clock provided to the current pipeline stage may be generated by a logic unit (for example, OR gate or AND gate) from the clock output signal of the first clock driving circuit 100 in the current pipeline stage and the inverted clocks of different versions of the clock output signal. The pulse width of the clock provided to the current pipeline stage may be determined by the output signal of the first clock driving circuit of the current pipeline stage and a phase of the inverted clock of the selected version of the output signal (that is, a delay time of the version of the inverted clock relative to the clock output signal).

The selector MUX1 may select one of two (or more) clock sub-paths as one of inputs of the logic unit 205 according to the selected signal 1, and the other input of the logic unit 205 is the clock output signal of the first clock driving circuit of the current pipeline stage. In this way, the output signal of the logic unit 205 is used as a clock signal for the current pipeline stage (especially the latch device therein), so that the duty cycle width is adjustable.

7

Figure 4:
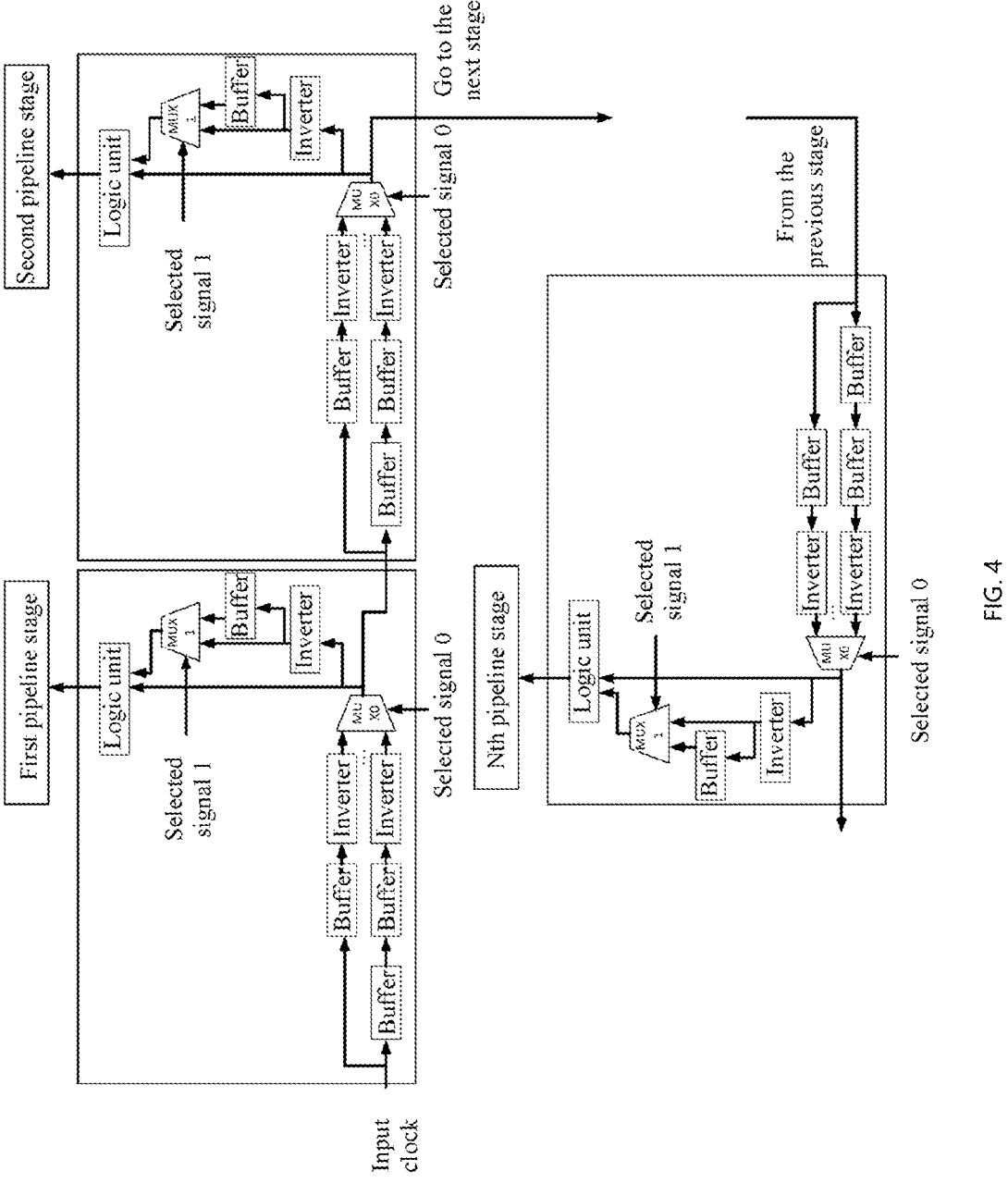
FIG. 4 shows a schematic diagram of a processor according to still another embodiment of the present disclosure.

FIG. 4 shows a schematic diagram of a processor according to still another embodiment of the present disclosure. In the embodiment of FIG. 4, a plurality of pipeline stages and clock driving modules corresponding to the pipeline stages are shown. The clock driving modules in all of the stages shown in the figure may include the clock driving circuit 100 and/or the clock driving circuit 200 described in the previous embodiments. The contents described above in each embodiment may also be applicable to the embodiment. Therefore, no further details are given again.

In addition, although in the example of FIG. 4, selected signals of each stage are shown as a selected signal 0 and a selected signal 1, it should be understood that the selected signals of each stage may be set independently.

FIG. 5 shows an exemplary timing diagram of a pipeline according to an embodiment of the present disclosure. Three stages P1, P2 and P3 in the pipeline shown in FIG. 4 are exemplarily shown in FIG. 5. As shown in the figure, MUX0 in each pipeline stages may be configured to control a delay of a clock provided to the current pipeline stage, and MUX1 may be configured to control a width of a clock pulse. Therefore, the timing requirements of the pipeline can be satisfied, for example, requirements for hold timing of a latch and requirements for a minimum pulse width of the latch.

It should be understood that the second clock driving circuit described above with respect to FIG. 3 and the like may also be arranged in the core of the processor together with the first clock driving circuit.

The processor according to the embodiment of the present disclosure may be used for processing or calculation of digital currency. Examples of digital currency may include, for example, Bitcoin, Litecoin, Ethereum, and other digital currency.

It should be further understood that the present disclosure further provides a computing system, which may include the processor according to any embodiment.

According to the embodiment of the present disclosure, a novel processor and computing system are provided. The processor and the computing system according to the present disclosure may be configured for processing and calculation of digital currency or virtual currency. According to the embodiment of the present disclosure, a flexibly configured clock path is provided, and a plurality of clock options are provided for a pipeline stage. The embodiment of FIG. 3 is used as an example, which provides (a number of input paths of MUX0=2) multiplied by (a number of input paths of MUX1=2)=4 clock options. More paths lead to more provided options. According to the embodiment of the present disclosure, clocks with flexible configuration may be provided for all the pipeline stages, thereby greatly improving the flexibility of design or the product yield of a mining machine processor.

A person skilled in the art should realize that the boundary between operations (or steps) described in the above embodiments is merely illustrative. A plurality of operations may be combined into a single operation, the single operation may be distributed in an additional operation, and the operations may be performed at least partially overlapping in time. Moreover, alternative embodiments may include a plurality of examples of particular operations, and the operation sequence may be changed in other various embodiments. However, other modifications, changes, and replacements may also exist. Therefore, the specification and accompanying drawings are to be regarded as illustrative rather than restrictive.

Despite the detailed description of some particular embodiments of the present disclosure by the examples, a person skilled in the art should understand that the foregoing examples are merely intended to describe rather than limit the scope of the present disclosure. The embodiments disclosed herein may be randomly combined without departing from the spirit and scope of the present disclosure. A person skilled in the art should also understand that various changes can be made to the embodiments without departing from the scope and spirit of the present disclosure. The scope of the present disclosure is defined by the appended claims.

What is claimed is:

1. A pipeline processor, comprising:
   a pipeline stage and a next pipeline stage adjacent to the pipeline stage, each comprising one or more sequential devices;
   a clock driving module, configured to provide a clock signal to the pipeline stage, wherein the clock driving module comprises a first clock driving circuit and a second clock driving circuit, and the first clock driving circuit comprises:
      a plurality of first clock paths, configured to receive a common clock input and provide corresponding clock signals respectively; and
      a first selector, configured to select a clock signal from the corresponding clock signals provided by the plurality of first clock paths and provide the selected clock signal for both a second clock driving circuit and a next clock driving module,
      wherein the second clock driving circuit is configured to adjust a pulse width of the clock signal selected by the selector and provide the clock signal with the adjusted pulse width for the pipeline stage; and
   the next clock driving module, having the same structure with the clock driving module and configured to provide another clock signal for the next pipeline stage.

2. The pipeline processor according to claim 1, comprising one or more cores, wherein the pipeline stage and the clock driving module are arranged in the core(s).

3. The pipeline processor according to claim 1, wherein the second clock driving circuit comprises:
   a plurality of second clock paths, configured to receive the selected clock signal respectively and provide clock signals with different phases based on the selected clock signal on respective second clock paths; and
   a logic unit, configured to generate the clock signal with the adjusted pulse width for the pipeline stage based on at least part of the clock signals with different phases.

4. The pipeline processor according to claim 3, wherein the plurality of second clock paths comprise at least a first path and a second path;
   wherein the first path provides the selected clock signal to the logic unit; and
   wherein the second path provides an inverted version or an inverted and delayed version of the selected clock signal to the logic unit.

5. The pipeline processor according to claim 4, wherein the second path comprises:
   an inverter, configured to receive the selected clock signal and generate a clock signal which is inverted to the selected clock signal; and
   two or more sub-paths, configured to provide different versions of the inverted clock signal respectively to a second selector; and
   the second selector, configured to select a version from the different versions of the inverted clock signal and provide the selected version to the logic unit.

6. The pipeline processor according to claim 3, wherein the logic unit is an AND gate or an OR gate.

7. The pipeline processor according to claim 5, wherein the two or more sub-paths respectively provide versions with different delays of the inverted clock signal to the second selector.

8. The pipeline processor according to claim 1, wherein the plurality of first clock paths receive a common clock input and respectively provide clock signals with different phases based on the clock input.

9. The pipeline processor according to claim 1, wherein the processor is a processor for digital currency.

10. The pipeline processor according to claim 1, wherein the one or more sequential devices comprise one or more latches, and the selected clock signal is used for the one or more latches.

11. The pipeline processor according to claim 1, wherein the one or more sequential devices comprise one or more latches, and the clock signal with the adjusted pulse width is used for the one or more latches.

12. A pipeline computing system, comprising the pipeline processor according to claim 1.

\*  \*  \*  \*  \*